June 28, 1932.    F. PRETSCH    1,865,209
FILTER
Filed Aug. 24, 1931    2 Sheets-Sheet 1
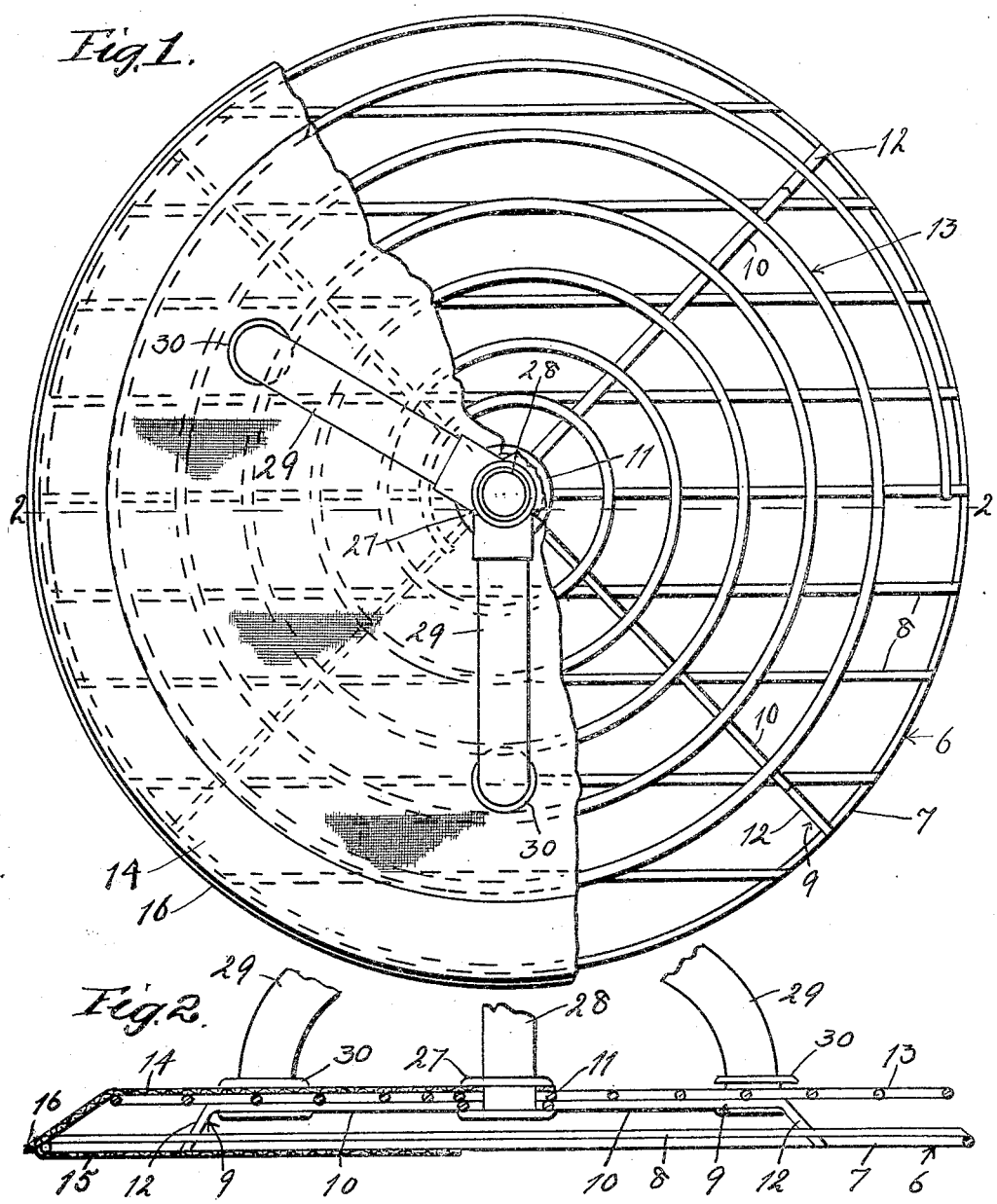

June 28, 1932.  F. PRETSCH  1,865,209
FILTER
Filed Aug. 24, 1931  2 Sheets-Sheet 2
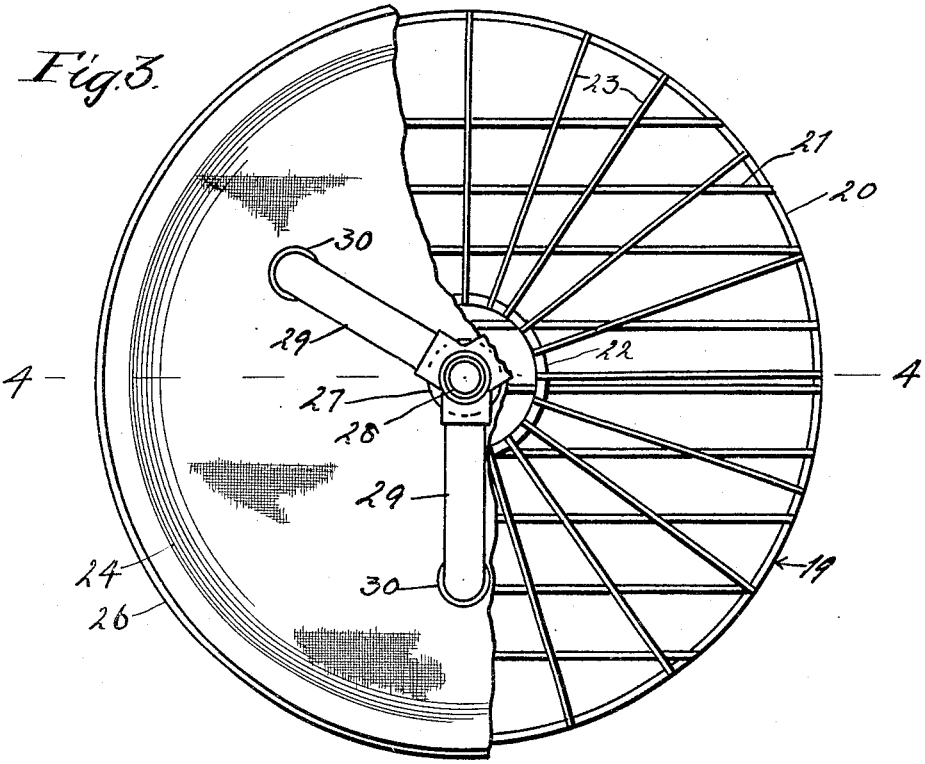
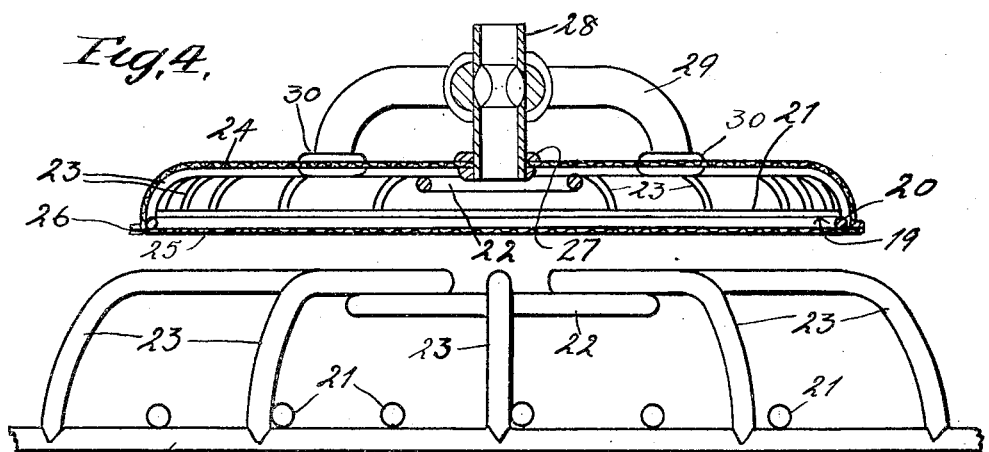
INVENTOR
Frank Pretsch
By W. W. Williamson
Atty.

Patented June 28, 1932

1,865,209

UNITED STATES PATENT OFFICE

FRANK PRETSCH, OF PHILADELPHIA, PENNSYLVANIA

FILTER

Application filed August 24, 1931. Serial No. 559,064.

My invention relates to new and useful improvements in a filter and has for one of its objects to simplify the construction of devices of this kind which will be simple in construction and inexpensive in the cost of manufacture.

Another object of the invention is to provide a filter which may be placed in an open vessel and submerged in the liquid to be filtered so that the latter will pass through all parts of the filtering medium or cloth giving the maximum filtering capacity to the device.

Another object of the invention is to provide a filter frame of unique construction which will hold the layers of the filtering cloth or medium apart so that the entire area of said filtering medium will always be in proper condition to function for the purpose for which it is intended.

Another object of the invention is to provide a filter in which the filtering medium is permanently secured upon the frame, thereby preventing the possibility of said filtering medium becoming separated from the frame so as to accidentally pass unwanted material from the container of the liquid to be filtered to the receptacle receiving the filtered liquid.

A further object of the invention is to provide a filter frame including a grid produced from a number of parallel bars or rods of suitable wire mounted on a boundary support and a convolute or spiral web mounted upon a spider which is connected with the boundary support and the spider being fastened so that the web will be in spaced relation to the bars or rods of the grid.

A still further object of the invention is to provide for taking off the filtered liquid from the inside of the filter at several locations and the means for accomplishing this acting to maintain the filter in a level position.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a top plan view of the filter constructed in accordance with my invention with a portion of the filtering medium, cloth or fabric torn away, to illustrate the construction of the metal frame and one of the legs of the multiple outlet conduit being broken off.

Fig. 2 is a section on the line 2—2 of Fig. 1, with parts of the outlet conduit broken away and the remaining parts left in elevation.

Fig. 3 is a view similar to Fig. 1, on a slightly reduced scale of a modification of the invention.

Fig. 4 is a section on the line 4—4 of Fig. 3, with the outlet conduit left in elevation.

Fig. 5, is an enlarged elevation of a similar section of the frame.

In carrying out my invention as herein embodied, 6 represents the filter frame illustrated in Figs. 1 and 2 and consisting of a boundary support 7 produced from suitable gage wire or other equivalent material and preferably in the form of a ring although I want it understood that I am not limited to this particular shape. On the boundary support 7, and preferably on what I will term the top part thereof, are mounted and fixed a number of parallel cross bars or rods 8 produced from suitable sections of wire of desirable gage, either the same as or different from that used to construct the boundary support, said cross bars or rods are welded or otherwise secured to the boundary support.

To the grid thus formed is secured a spider 9 consisting of a number of legs 10, preferably four, fixed at their inner ends, as by welding, to a ring or hub 11 with their outer ends bent downward to produce, in effect, feet 12 by which the spider is fixed, preferably through the medium of welding, to the boundary support with the main portions or bodies of the legs in spaced relation to the grid.

On the spider is fixed a web 13 consisting of a wire of suitable gage, or equivalent material, of convolute or spiral formation and fixed, as by welding, at all points where it crosses the spider legs.

The filter medium consists of two layers 14 and 15 of suitable cloth or other fabric of such size and shape as to fit over opposite sides of the top and bottom of the frame with the edges stitched or otherwise secured together as at 16, whereby the filtering medium is permanently secured over the frame.

Since it is only the outer surface of the filtering medium that arrests the foreign matter, it is only necessary that said outer surface be cleaned and therefore the filtering medium does not have to be removed from the frame for cleaning purposes. When it becomes necessary to replace the filtering medium, the stitches may be severed and the two layers removed and other layers then put in their place and stitched together along their edges.

A modified construction of the frame only is shown in Figs. 3, 4 and 5, wherein the numeral 19 denotes said frame including a grid similar to the one in the preferred form and therefore consisting of a boundary support 20 with parallel cross bars or rods 21 fixed to the top thereof. In lieu of the spider and web, a ring or hub 22 is provided to which are secured the inner ends of a plurality of radial arms or spokes 23 having their outer ends bent down and secured to the boundary support 20, whereby the main or body portions of said arms and the hub 22 will be spaced from the grid or the cross bars thereof as plainly shown in Figs. 4 and 5.

The filtering medium is identically the same as that in the preferred form and consists of the two layers of cloth or fabric 24 and 25 having their edges stitched together as at 26.

The top layer of the filtering medium is provided with a centrally disposed grommet 27 having an upstanding nipple 28 to which a suitable length of hose may be connected to draw off the filtered liquid and convey it to a suitable place of disposal and as will be obvious, said nipple may be a straight piece of pipe or a goose neck or any other suitable or desirable shape and since the particular configuration of said nipple does not enter into the invention, only the simplest form has been illustrated.

If found desirable, the nipple may be provided with three inlets intermediate its ends with a piece of pipe or secondary nipple 29 secured to each inlet and each connected at a different location to the top layer of the filtering medium by a grommet 30. By providing the three branch outlets from the filter all communicating with the nipple, a multiple outlet conduit structure is provided which will quickly draw off the filtered liquid thereby greatly increasing the capacity of filters of this kind.

While the multiple outlet conduit structure may be used with any size of filter, it is particularly adapted for use in connection with very large ones, and in the case of the smaller filters, the branch outlets or auxiliary nipples may be eliminated and only the central nipple used.

The multiple outlet conduit structure has another advantage, since the branch outlets or auxiliary nipples are of rigid material, the same as the central nipple, and since they are connected with the filter at widely separated points they have a tendency to maintain the filter in a level position within the liquid to be filtered.

In using the filter, the same is placed in a suitable receptacle containing the liquid to be filtered and the hose which is connected with the nipple 28 has its free end inserted in another receptacle for syphoning the liquid from the receptacle containing the filter through said filter into the other receptacle.

Of course, I do not wish to be limited to the exact details of construction herein shown and described as these may be varied within the limits of the appended claims without departing from the spirit of my invention.

Having thus fully described my invention, what I claim as new and useful is:—

1. A filter comprising a boundary support, cross bars secured to said boundary support in parallel relation to each other, a spider secured to the boundary support and arranged in spaced relation to the cross bars, a convolute web fixed to the spider, and layers of filtering medium stretched over said frame and having their edges secured together.

2. A filter comprising a boundary support, a plurality of parallel cross bars secured to the top of said boundary support, a spider consisting of a ring and radiating legs with the outer ends of said legs bent downward, said spider being secured by means of the downwardly bent ends to the boundary support, a web formed from the spirally wound wire fixed to the legs of the spider at all contact points, and a filtering medium consisting of two layers of suitable fabric having their edges stitched together and completely enclosing said frame with the main portions of said layers held in spaced relation by the cross bars and web.

3. A filter comprising a boundary support, parallel cross bars having the ends thereof secured to said boundary support, legs having the outer ends bent downward and secured to said boundary support, a hub secured to the inner ends of said legs and with the latter forming a spider in spaced relation to the cross bars, a spirally wound wire secured to said legs, a filtering medium completely surrounding and permanently enclosing the boundary support, cross bars, spider and spirally wound wire, and an outlet connection secured to the filtering medium.

4. A filter comprising a boundary support, parallel cross bars having the ends thereof secured to said boundary support, legs having the outer ends bent downward and secured to said boundary support, a hub secured to the inner ends of said legs and with the latter forming a spider in spaced relation to the cross bars, a spirally wound wire secured to said legs, a filtering medium completely surrounding and permanently enclosing the boundary support, cross bars, spider and spirally wound wire, and a multiple outlet conduit connected at a plurality of points to the filtering medium and communicating with the interior of the filter.

5. A filter comprising a grid, a web, a spider for supporting the web in spaced relation to the grid, top and bottom layers of filtering material covering the web and grid respectively and having the edges of said layers of filtering medium stitched together, a central outlet element secured to the top layer of the filtering fabric centrally thereof and a plurality of auxiliary outlet elements also secured to the top layer of the filtering fabric and connected with the central outlet element.

6. A filter comprising a boundary support, a plurality of parallel cross bars secured to the top of said boundary support, a plurality of radial arms having their outer ends bent downward and secured to said boundary support, a ring secured to the inner ends of said arms, and a filtering medium completely enclosing said boundary support, cross bars, arms and ring and permanently secured in place.

7. The structure set forth in claim 6, in combination with a multiple outlet secured to that portion of the filtering medium overlying the arms.

In testimony whereof, I have hereunto affixed my signature.

FRANK PRETSCH.